US011310956B1

(12) United States Patent
Reed

(10) Patent No.: US 11,310,956 B1
(45) Date of Patent: Apr. 26, 2022

(54) SLURRY APPLICATOR WITH INDEPENDENT OPENING AND CLOSING UNITS

(71) Applicant: VTI, L.L.C., Washington, IA (US)

(72) Inventor: Phil Reed, Washington, IA (US)

(73) Assignee: VTI, L.L.C., Washington, IA (US)

( * ) Notice: Subject to any disclaimer, the term of this patent is extended or adjusted under 35 U.S.C. 154(b) by 0 days.

(21) Appl. No.: 17/496,493

(22) Filed: Oct. 7, 2021

Related U.S. Application Data

(60) Provisional application No. 63/195,516, filed on Jun. 1, 2021.

(51) Int. Cl.
*A01C 23/02* (2006.01)
*A01C 5/06* (2006.01)
*A01B 15/18* (2006.01)

(52) U.S. Cl.
CPC ............ *A01C 23/022* (2013.01); *A01C 5/064* (2013.01); *A01B 15/18* (2013.01)

(58) Field of Classification Search
CPC ..... A01C 23/022; A01C 5/064; A01C 23/021; A01C 23/02; A01C 23/00; A01C 5/062; A01C 5/06; A01C 5/00; A01B 15/18; A01B 15/00
See application file for complete search history.

(56) References Cited

U.S. PATENT DOCUMENTS

| | | |
|---|---|---|
| 3,378,585 A | 4/1968 | Giacomo |
| 5,272,992 A | 12/1993 | Barbour |
| 5,370,068 A | 12/1994 | Rawson |
| 5,649,602 A | 7/1997 | Bruce |
| 5,657,707 A | 8/1997 | Dresher |
| 5,785,129 A | 7/1998 | Keller |
| 5,887,664 A | 3/1999 | Whalen |
| 6,138,590 A | 10/2000 | Colburn |
| 6,701,856 B1 | 3/2004 | Zoske |
| 7,143,838 B2 | 12/2006 | Piccat |
| 7,565,870 B2 | 6/2009 | Martin |
| 7,575,066 B2 | 8/2009 | Bauer |
| 7,581,503 B2 | 9/2009 | Martin |
| 7,823,807 B1 | 11/2010 | Bauer |
| 9,137,938 B2 | 9/2015 | Zimmerman |

(Continued)

FOREIGN PATENT DOCUMENTS

| | | |
|---|---|---|
| CA | 2561846 | 4/2008 |
| EP | 1774844 | 4/2007 |

OTHER PUBLICATIONS

Reed, Phil—U.S. Appl. No. 17/406,719, filed Aug. 19, 2021.

(Continued)

*Primary Examiner* — Christopher J. Novosad
(74) *Attorney, Agent, or Firm* — Shuttleworth & Ingersoll, PLC; Jason Sytsma

(57) ABSTRACT

A first biasing element is positioned between an opening unit and a first frame for urging the opening unit downward. A lateral pivot combines the first biasing element to the first frame to allow for lateral movement in a horizontal plane of the opening unit. A first resilient device is positioned between the closing unit and the first frame to allow for lateral movement about a vertical axis of the closing unit and to urge the closing unit back to a neutral position. A second resilient device is positioned between the closing unit and the first frame to allow for vertical movement about a horizontal axis and to urge the closing unit back to a neutral position.

28 Claims, 9 Drawing Sheets

(56) References Cited

U.S. PATENT DOCUMENTS 9,769,980 B1 9/2017 Reed
2008/0302286 A1 12/2008 Martin

OTHER PUBLICATIONS

Yetter Farm Equipment, screen print from www.yetterco.com product page for Yetter Avenger (Z1).

Yetter Farm Equipment, "Yetter Avenger Deep Placement System" Oct. 18, 2011, You Tube—screen print of website video: http://youtu.be/1wGca1H11d1 (Z2).

SoilWarrior—Screen print from webpage:http://soilwarrior.com/equipment/soilwarrior/ (Z3).

Puck Custom Enterprises, Inc. "Pull-Type Applicator—ETS & PCB", Apr. 30, 2012, You Tube—Screen print of website video: http://www.youtube.com/watch?v=hYhQgamgmNC (Z4).

SoilWarrior—Screen print from webpage:http://soilwarrior.com/equipment/honeywarrior/ (Z5).

Yetter Farm Equipment—2987 Magnum for Fertilizer Application screen print from online catalog at: http://www.yetterco.com/medialibrary/documents/364.pdf (Z6).

Yetter Farm Equipment, Mick Zoske, "Yetter NH3 Magnum on Zoske's 60".

3pt Toolbar Pulled with John D . . . Jun. 6, 2012, Screen print of website video: http://www.youtube.com/watch?v=c9BCPgprDTA&feature=youtu.be (Z7).

Yetter Farm Equipment, Mick Zoske, "12 Row Yetter NH3 Magnum on Zoske's 60' Toolbar Pulled with Jo . . . ", Jun. 4, 2012, You Tube—Screen print of website video at: youtu.be/QTiqGUyT4Tw (Z8).

Yetter Farm Equipment, Mick Zoske, "Yetter NH3 Magnum on Zoske's 60" Toolbar Pulled with John Deer . . . ", Jun. 6, 2012, You Tube—Screen print of website video: youtu.be/WmaQULgp1mM (Z9).

Yetter Farm Equipment, Mick Zoske, "Yetter NH3 Magnum on Zoske's 60' 3pt Toolbar Doing Head Lands", Jun. 6, 2012, You Tube—Screen print of website video: http://www.youtube.com/watch?v=NdLtcOgBCY&feature= youtu.be (Z10).

Yetter Farm Equipment, Adam Fenning, "Azland Avenger Toolbar visit fenningequipment.com for info on disc . . . ", Dec. 23, 2011, You Tube Screen print of website video:http://www.youtube.com/watch?v=nc6STxRhbBs&feature=youtu.be (Z11).

Bazooka Farmstar—Coulter Till, Screen print from webpage: http://www.bazookafarmstar.com/products/manure-injection-product/toolbars/coulter-till/ (Z14).

Bazooka BazookaFarmstar, "Farmstar Coulter Till", Jan. 23. 2012, You Tube—Screen print of website video: http://www.youtube.com/watch?v=25LfX40cW7Q&feature=youtu.be (Z15).

Winske, Inc., Mick Zoske, "Winske Inc. TSS No-Till Injector Fall 2012", Sep. 8, 2012, You Tube—Screen print of website video: http://www.youtube.com/watch?v=SdtrpVDK3fM&feature=youtu.be (Z16).

Winske, Inc., Mick Zoske, "Jamesway 9600 Ultra-Trac with Winske 8 Row No-Till Toolbar", Sep. 7, 2012, You Tube—Screen print of website video: http://www.youtube.com/watch?v=OekxSHVWYvk&feature=youtu.be (Z17).

Dawn Equipment, 6000 Universal Fertlizer Applicator, Anhydra 6000—Screen print from webpage: http://www.dawnequipment.com/6000_fertilizer_applicator.html (Z18).

Dawn Equipment, Dawn Equipment, "Description of the 2011 Dawn 6000 Universal Fertilizer Applicator", Sep. 12, 2011, You Tube—Screen print of website video: http://www.youtube.com/watch?v=bgD2r08XbM4&feature=youtu.be (Z19).

Dawn Equipment, Dawn Equipment, "6000 manure_2009.wmv", Dec. 11, 2009, You Tube—Screen print of website video:http://www.youtube.com/watch?v=fB_iT09mf7g&feature=youtu.be (Z20).

Dawn Equipment, Dawn Equipment, "Manure Injection Chesapeake Bay Watershed Dawn 6000", You Tube—Screen print of website video: http://youtube.com/6eHiAYkeKf0 (Z21).

Dawn Equipment, Dawn Equipment, "Manure Injection Chesapeake Bay Watershed Dawn 6000 part 2", Oct. 21, 2011, You Tube—Screen print of website video:http://www.youtube.com/watch?v=b6qVTjY64Ds&feature=youtu.be (Z22).

Yetter Manufacturing Company, Press Release, New Product Information, "New Attachment Option for Yetter Mavericks Expands Versatility" (Z23).

Yetter Manufacturing Company, Mick Zoske, "Yetter HR Plus Maverick with VTA kit view from toolbar", May 16, 2012, You Tube—Screen print of website video: http://www.youtube.com/watch?v=13Luhl Bk6c&feature=youtu.be (Z24).

Yetter Manufacturing Company, Mick Zoske, "Yetter HR Plus Maverick with VTA kit in standing corm stalks", May 16, 2012, You Tube—Screen print of website video: http://www.youtube.com/watch?v=77GMWL9AXAQ (Z25).

Till-Tech System, TillTech, "Till-Tech Manure Injector with Stinger attachment.avi", Jan. 4, 2010, You Tube—Screen print of website video: http://www.youtube.com/watch?v=zpaUrhXm1TY&feature=youtu.be (Z26).

Dietrich Series 70 Manure Injector—Screenprint from webpage at: http://www.haroldsequipment.com/manufacturers/dietrich/manure-injectors/dietrich-series-70-manure-injector (Z27).

CFC Distributors, Inc., Vortex Blade—Screen print from webpage at: http://www.cfcdist.com/shopping/vertical-tillage-blade-vortex-to-fit-discarbors-c-6_472.html (Z28).

T. Price, What Should My No-till Planter Look Like, Dec. 1999, Agdex No. 100/741, ISSN No. 0157-8243 found at h :/www.nt.gov.au/d/Content/File/p/Pasture/311 (Z29).

Soil Warrior—Environmental Tillage Systems, Inc., 16R Mini Warrior video, Sep. 29, 2008 screen print from webpage http:/www.youtube.com/watch?v=W_Mu5wYVQrY (Z30).

Soil Warrior—Environmental Tillage Systems, Inc., Function of Mini Warrior Zone Tillage video, Sep. 18, 2008, screen print from webpage http:/www.youtube.com/watch?v=vcU-V5fU9wk (Z31).

Dan Zinkand, Strip-Tillers Putting Manure in Its Place, 2014, Lessiter Publications, Brookfield, WI 53045 (Z32).

Bigham Brothers, Inc., Super Duty Cultivator, Screen print from web: http://www.bighambrothers.com/cultivator-super-duty.html (Z33).

Summers, Supercoulter Plus product brochure (Z34).

Mick Zoske, letter regarding prior art dated Dec. 11, 2013.

Zoske's Sales & Service, Inc., Answer to Interrogatory explaining basis for invalidity dated Jul. 28, 2014.

David Breiner, email regarding prior art dated Apr. 23, 2014.

Summers Manufacturing Co., Inc., Summers Supercoulter Plus, product webpage.

Shafer Welding, SchaferWeldingsMole, "The Mole Manure Applicator", Sep. 29, 2010, You Tube—Screen print of website video: http://www.youtube.com/watch?v=TdFSGPDaLPo&feature=youtu.be (Z12).

Shafer Welding, SchaferWeldingsMole, "Schafer Weldings Mole 3pt Fold Manure Appli . . . ", Jan. 17, 2011, You Tube—Screen print of website video: http://youtu.be/lsCcLfe8_Go (Z13).

SLURRY APPLICATOR WITH INDEPENDENT OPENING AND CLOSING UNITS

CROSS-REFERENCE TO RELATED APPLICATIONS

The present application claims the benefit of U.S. Provisional Patent Application No. 63/195,516 filed Jun. 1, 2021, which is hereby incorporated herein by reference.

TECHNICAL FIELD

This disclosure relates to agricultural implements, and, more specifically, the present disclosure relates to an apparatus for subsoil application of livestock waste.

BACKGROUND INFORMATION

Historically, livestock waste, particularly in solid form, has been spread on the surface of the soil by a manure spreader using a flail to fling the material to the rear. A more modern side-discharge spreader also discharges the material on the surface of the soil. The advent of confinement systems for animals, which include pits below the confinement area, produces a large amount of animal waste, which must be handled and disposed of in a slurry form. Typically, the slurry is pumped into a large tank carried by a wagon, but it is still, for the most part, spread or sprayed on the surface of the soil.

This procedure has, as a principle objection, a strong odor, which resides after the waste is spread. Moreover, surface spreading of animal waste creates a hazard with the potential runoff of nitrates into rivers and streams or seeping of the material into ground water. This is objectionable because livestock waste is high in nitrogen, and with increasing concern with the quality of drinking water, this procedure is becoming less and less acceptable.

Various methods have been proposed for depositing the slurry into the ground. One such method involved creating a trough by dragging a knife or using a flat coulter set at an angle with respect to the trough through the soil to create the trough. Dragging a knife through the soil, however, limits the speed by which the tractor can travel and inefficiently wastes fuel. Both methods compact the soil on the sides of the trough resulting in less or slower absorption of the slurry into the ground.

The process was greatly improved by a device and method previously patented by the inventor hereof in U.S. Pat. No. 8,550,019 titled, Slurry Applicator for an Agriculture Machine, the content of which are hereby incorporated by reference herein. This device deposits slurry into the ground by cutting a trough in the ground with a rotating member that displaces the soil from the trough upwardly and airborne with respect to the ground. While the soil is airborne, slurry is added to the trough. Then, the soil is directed downward into the trough after the slurry has been deposited to cover the slurry with the soil.

Even with this improved apparatus and method, what is needed is an improvement that provides greater mobility of the applicator across the rough terrain of a field.

SUMMARY

Disclosed is a slurry injector comprising an opening unit for creating a trough, a hose positioned behind the opening unit for directing slurry into the trough, and a closing unit positioned behind the hose for closing the trough. A first biasing element is positioned between the opening unit and the first frame for urging the opening unit downward. A lateral pivot combines the first biasing element to the first frame to allow for lateral movement in a horizontal plane of the opening unit. A first resilient device is positioned between the closing unit and the first frame to allow for lateral movement about a vertical axis of the closing unit and to urge the closing unit back to a neutral position. A second resilient device is positioned between the closing unit and the first frame to allow for vertical movement about a horizontal axis and to urge the closing unit back to a neutral position.

In an embodiment, the first biasing element is a torsion spring. The torsion spring comprises multiple coils around an axis which is oriented parallel to the ground. An extending portion extends from an end of the multiple coils for attaching the torsion spring to the opening unit. The extending portion is oriented at an angle α with respect to the ground. The torsion spring can also comprise a vertical extending portion that extends from an end of the multiple coils. A through hole in the vertical extending portion can be provided. A sleeve with a hole extending through it is attached to the first frame and the sleeve receives the vertical extending portion of the torsion spring. A pin extends through the hole in the vertical extending portion of the torsion spring and the hole in the sleeve to combine the two together and allow for lateral movement in a horizontal plane of the opening unit.

In an embodiment, the first resilient device can comprise an outer casing with a plurality of sides, an inner tube with a plurality of sides, and a plurality of inserts each one of which is positioned between one of the plurality of sides of the inner tube and the outer casing. The closing unit is combined to a second frame and the second frame is combined to the outer casing of the first resilient device and the first frame is combined to the inner casing of the first resilient device with the vertical axis extending therethrough. This allows the second frame to pivot with respect to the first frame about the vertical axis.

In an embodiment, the second resilient device can comprise of an outer casing with a plurality of sides, an inner tube with a plurality of sides, and a plurality of inserts each one of which is positioned between one of the plurality of sides of the inner tube and the outer casing. The closing unit is combined to a third frame and the third frame is combined to the outer casing of the second resilient device and the second frame is combined to the inner casing of the second resilient device with a horizontal axis extending therethrough. This allows the third frame to pivot with respect to the second frame about a horizontal axis.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
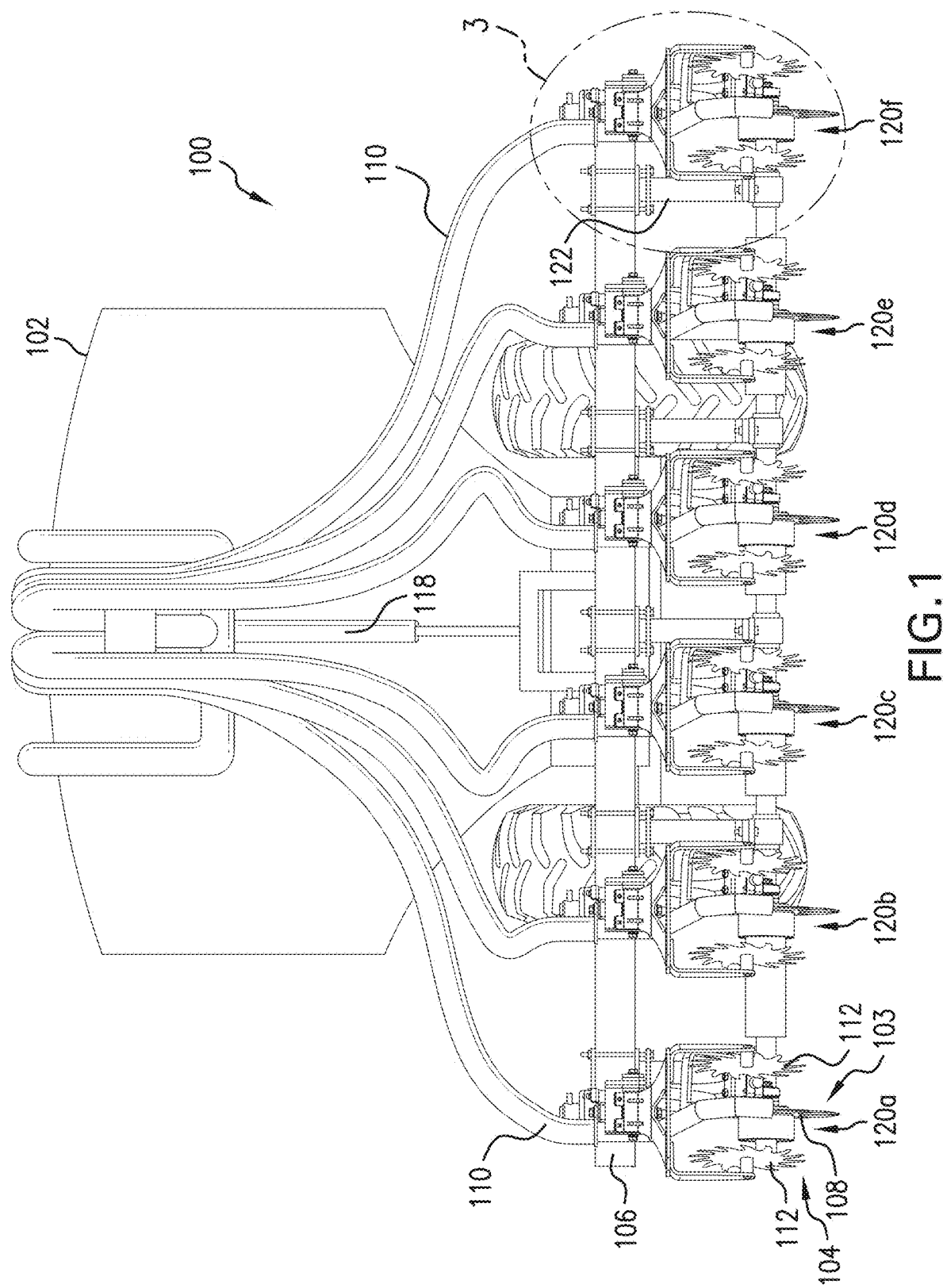
FIG. 1 is an illustration of a slurry injection system according to this disclosure.
Figure 2:
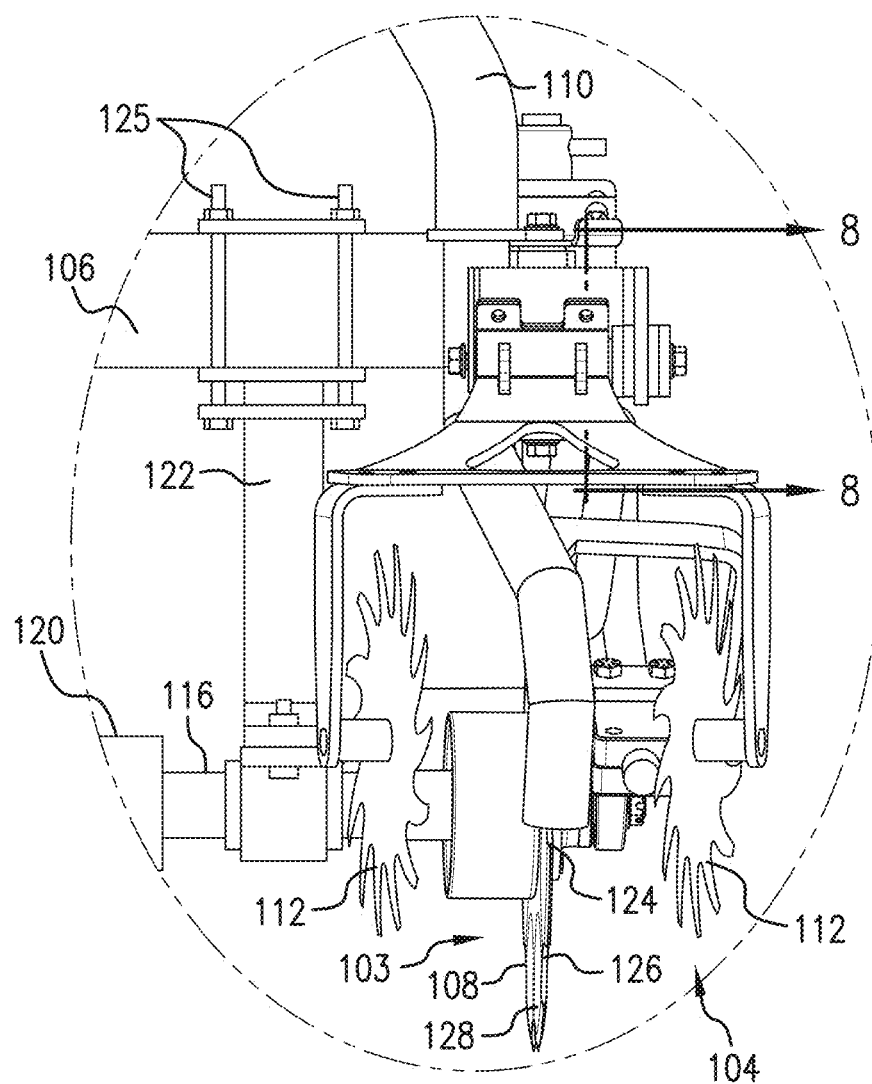
FIG. 2 is a close-up view of a slurry injector of the slurry injection system of FIG. 1.

Referring to FIG. 1, shown is slurry injection system 100 according to this disclosure. A tractor pulls a tanker 102 full of liquid manure slurry through a field. Attached to the back end of tanker 102 is a toolbar 106 connected to tanker 102 by a hitch. At least one slurry injector 120 and preferably a plurality of slurry injectors 120a-120f are combined to toolbar 106 for injecting liquid slurry from tanker 102 into the ground. Tanker 102 has conventional pumps for moving the slurry through hose 110 each of which is connected to a corresponding one of slurry injectors 120a-120f on toolbar 106. In other embodiments, tanker 102 can be omitted and replaced with a drag-hose where liquid slurry is pumped from a pit through long hose to slurry injector(s) 120. A cylinder 118 connected between tanker 102 and toolbar 106 when actuated pushes toolbar 106, and thus slurry injectors 120a-120f into the ground for operation.

Slurry injector 120 injects the slurry into the ground by creating trench with an opening unit, which can be implemented as a fixed knife, a flat coulter angled with respect to the direction of travel, or a rotating coulter 108, adding liquid slurry to the trench through hose 110, and then covering the trench back up with a pair of containment wheels 112. The preferred method uses rotating coulter 108 with flutes, as described below, and further described in U.S. Pat. No. 8,550,019 titled, Slurry Applicator for an Agriculture Machine describes the general operation of slurry injector 120 illustrated herein, which patent is hereby incorporated by reference herein. The other embodiments, are identified because the designs herein could be implemented into any type of knife or rotating coulter opening system.

Figure 3:
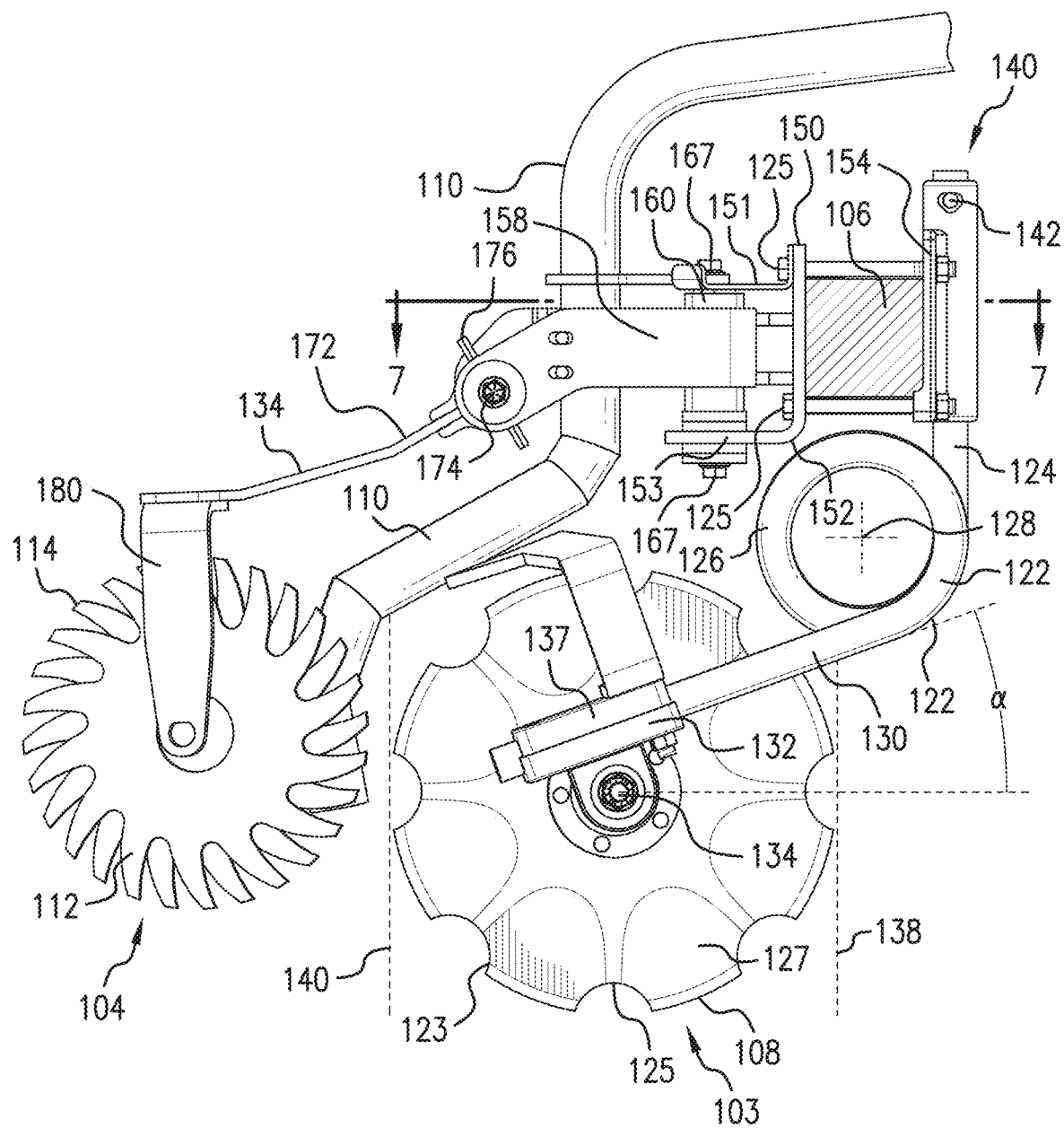
FIG. 3 is a side view of slurry injector of FIG. 2.

Turning to FIG. 3, coulter 108 can be a wave-shaped disc designed to cut into the ground and eject soil to create trough 109. Coulter 108 can be a directional coulter, such as a Turbo®, Vortex®, or wavy coulter that at sufficient speed operates by throwing soil upward and airborne to create a trough. The waves in coulter 108 can give it a functional width greater than the width of the steel. Coulter 108 can be formed, for example, from an approximately quarter-inch thick piece of flat steel with eight notches formed around its circumference and eight waves 127 or angled flutes to create a blade with a functional width of 1¾ inches. In such coulters, wave 127 can have its low points near the center of notch 125 and it gradually slopes upward to its high point on radial line 129. The shape of coulter 108 is designed such that, in forward rotation through the ground, a leading edge 123 of wave 127 cuts cleanly into the ground with minimal compression of the soil on lateral sides of the cut to allow for maximum absorption of the slurry. As leading edge 123 of wave 127 exits trough 109, the angle of wave 128 as it exits the ground causes large chunks of soil 131 to eject upward from the ground to create a trough 109 for slurry to flow from hose 110 generally uninterrupted into trough 109. A person skilled in the art will readily realize that coulter 108 can take various shapes provided it is functional in the manner described above.

A biasing element 122 is positioned between toolbar 106 and coulter 108. Biasing element 122 allows coulter 108 to move vertically up and down to absorb vibrations as slurry injection system 100 travels through the field. In this regard, biasing element 122 can be any device that urges coulter back to position in the ground. Such devices, include, but are not limited to, a spring, cylinder (hydraulic, pneumatic, or electric), or a resilient material such as rubber or spring steel. In the illustrated embodiment, biasing element 122 is a torsion spring comprising multiple coils 126 around an axis 128, which is generally parallel to the ground, a vertical extending portion 124 that extends from one end of multiple coils 126 for attaching biasing element 122 to toolbar 106, and an extending portion 130 that extends from the opposite end of multiple coils 126 for attaching biasing element 122 to coulter 108.

Biasing element 122 is configured in such a manner that when toolbar 106 is urged into the ground by cylinder 118, coulter 108 is similarly urged into the ground. To facilitate this, extending portion 130 can be oriented at an angle α with respect to a line parallel to the ground where a can be approximately 30° but can be 5° through 55° or any angle there between.

Extending portion 130 is clamped to a hub 132 that fits on an axle 134 for coulter 108 between a pair of plates 137. This directly fixes coulter 108 to extending portion 130 of biasing element 122, so that vertical vibrations are absorbed by biasing element 122 and coulter 108 is urged back into the ground.

Figure 4:
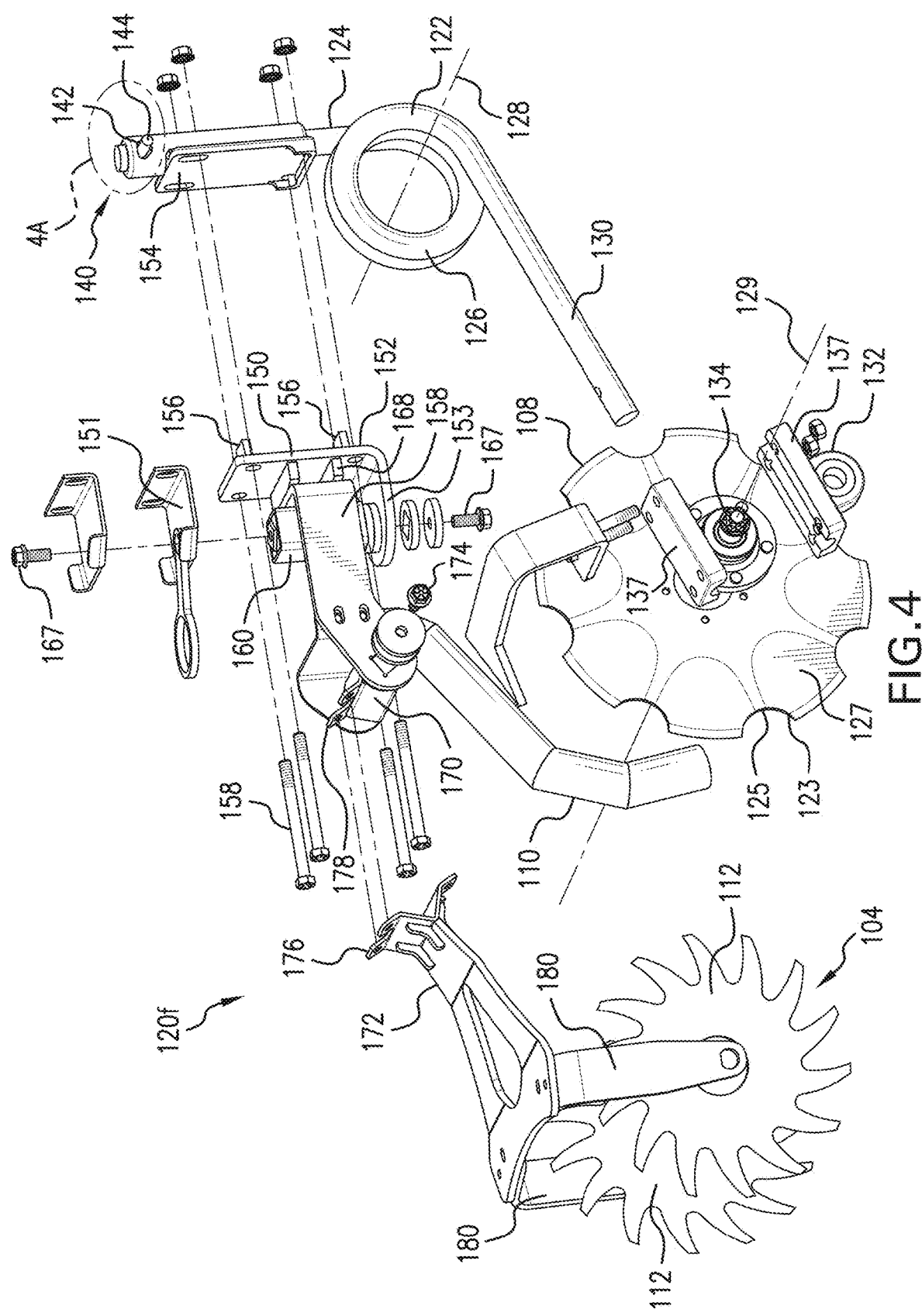
FIG. 4 is an exploded view of the slurry injector of FIG. 2.
Figure 4A:
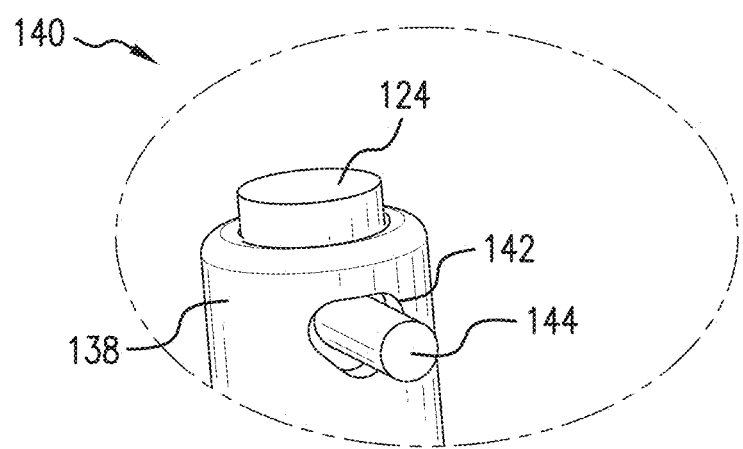
FIG. 4A is a close-up view of area 4A of FIG. 4.

Biasing element 122 can also be attached in such a manner as to allow lateral, side-to-side motion of coulter 108. In one embodiment, biasing element 122 can be attached to toolbar 106 by a lateral pivot 140 to allow side-to-side pivoting motion of coulter 108. In an embodiment, as better seen in FIG. 4A, which is a close-up view of area 4A of FIG. 4, lateral pivot 140 comprises of a sleeve 138 with a two-lobed hole 142 (such as a heart-shaped hole) in sleeve 138. A through hole extends through vertical extending portion 124 of biasing element 122. When vertical extending portion 124 is positioned in sleeve 138 with the through hole aligned with two-lobed hole 142, a pin 144 can join the two together. This allows coulter 108 to pivot laterally, side-to-side. When vertical extending portion 124 moves to the left it is constrained by pin 144 in the left lobe of two-lobed hole 142 and when vertical extending portion 124 moves to the right it is constrained by pin 144 in the right lobe of two-lobed hole 142. The combination of biasing element 122 and lateral pivot 140 provides coulter 108 with independent vertical and lateral movement with respect to toolbar 106.

Returning to FIGS. 3-4, a closing unit 104 is also provided with independent vertical and lateral movement with respect to toolbar 106. A first frame 150 is attached to toolbar 106. First frame 150 can comprise of a plate 152, which abuts against toolbar 106, attached to another plate 154, which abuts against the other side of toolbar 106 to which sleeve 136 of lateral pivot 140 is attached. Plate 152 and plate 154 are attached together by fasteners 157 to fix slurry injector 120 to toolbar 106. A pair of centering plates 156 can be combined to one or both of plate 152 and plate 154 to fix the vertical alignment of first frame 150 with respect to toolbar 106.

Closing unit 104 pivots with respect to first frame 150 and toolbar 106. Closing unit 104 is attached to a second frame 158. Second frame 158 is separated from first frame 150 by a resilient device 160, to which second frame 158 is attached, to urge second frame 158 and closing unit 104 back to a neutral position. Resilient device 160 allows closing unit to pivot side to side in the horizontal plane. Any oscillations or jostling of closing unit 104 will be absorbed and dampened by resilient device 160 as it pivots back and forth.

Figure 5:
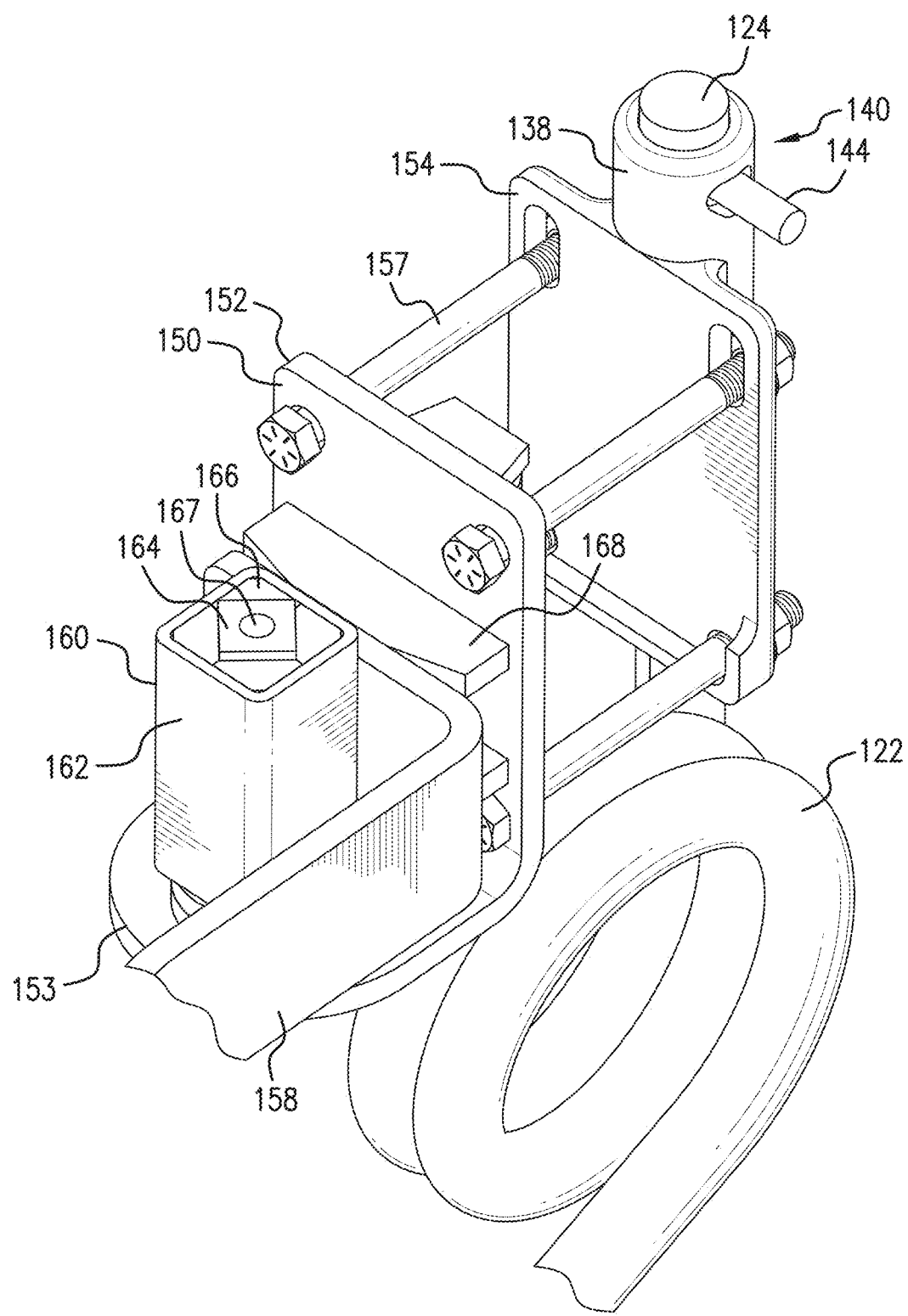
FIG. 5 is a close-up view of the biasing elements of the slurry injector of FIG. 2.
Figure 6:
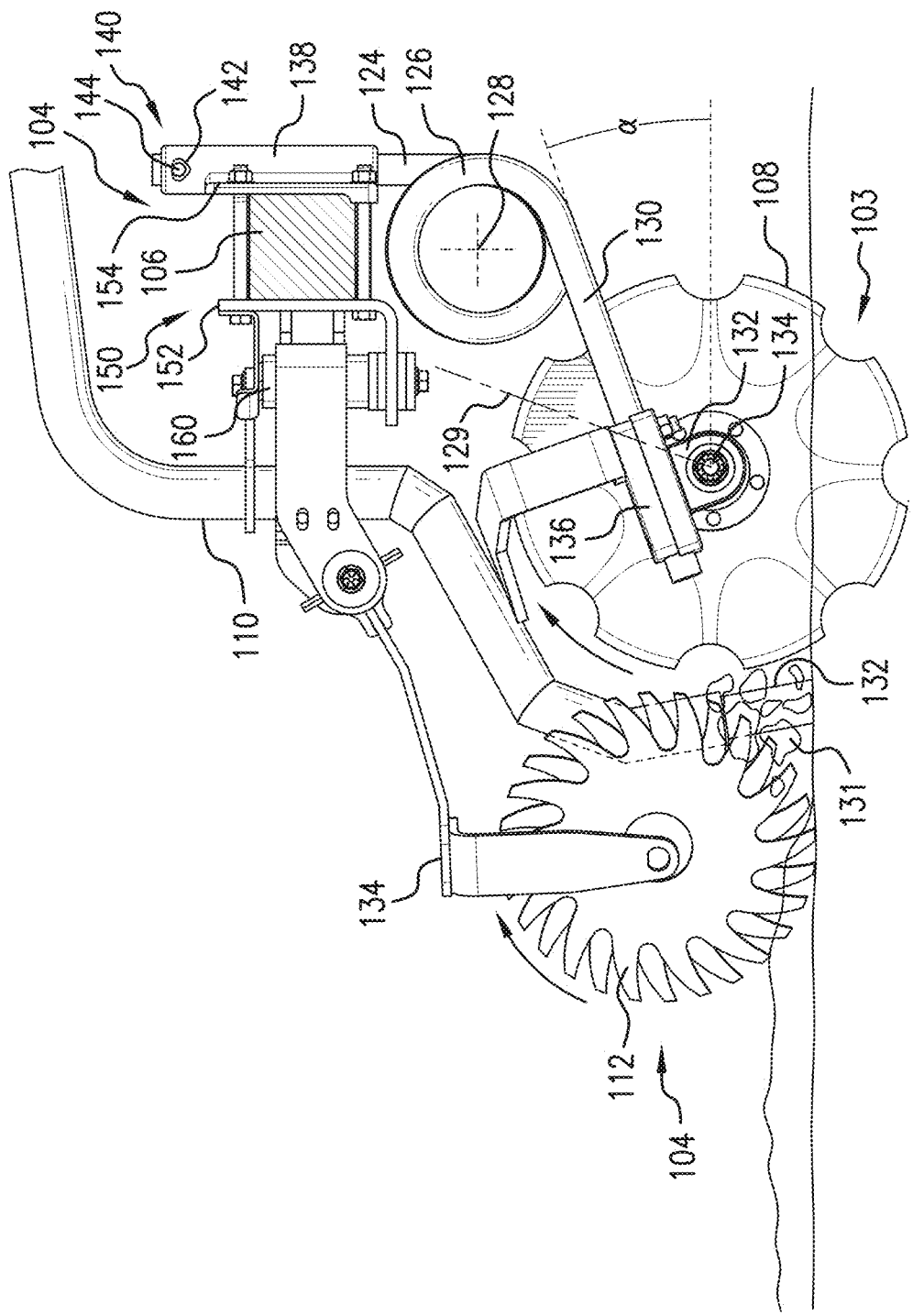
FIG. 6 is a side view of the slurry injector of FIG. 2 in operation.
Figure 7:
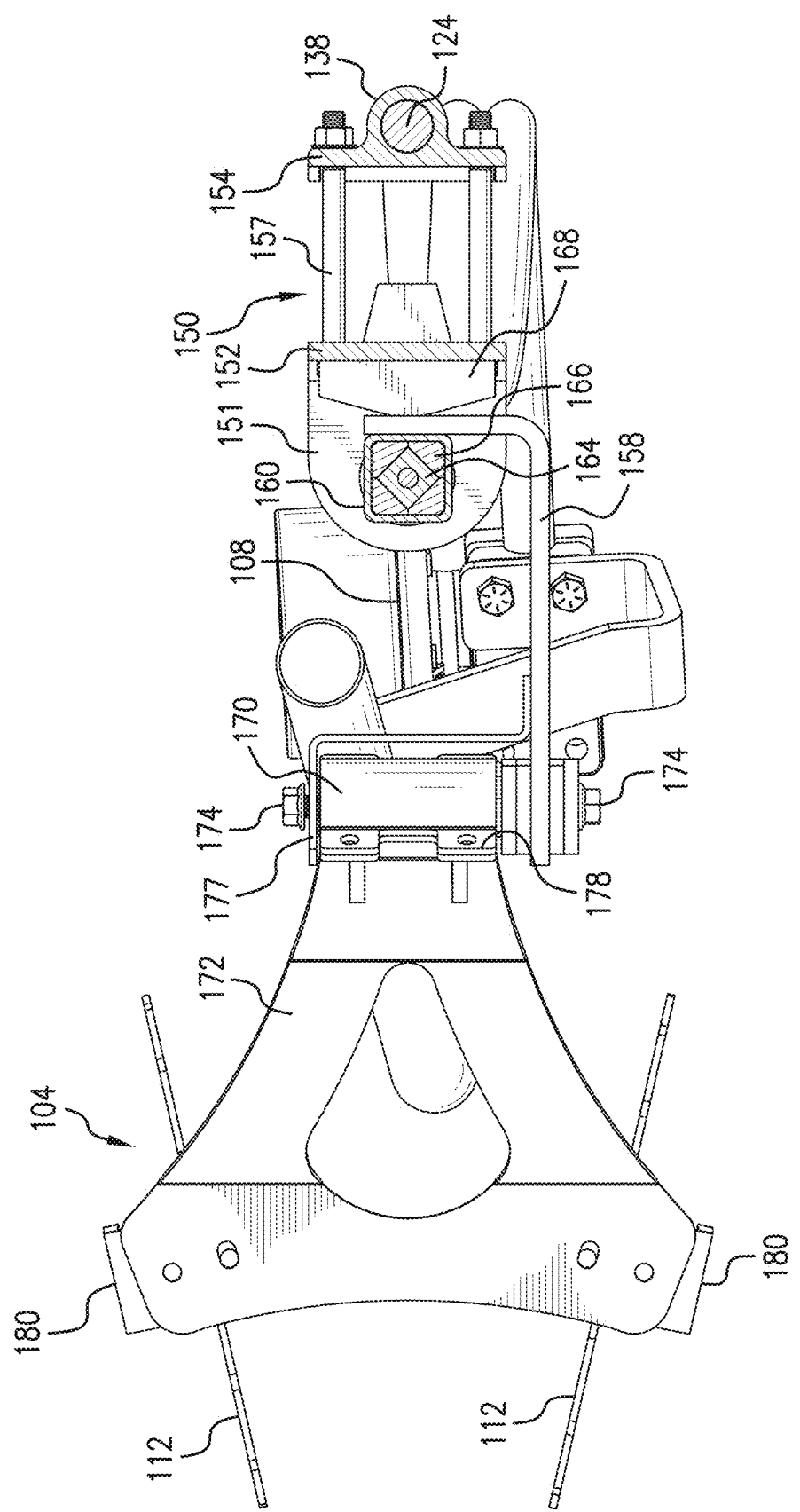
FIG. 7 is a top-sectional view of the slurry injector of FIG. 3 taken on the line 7-7.
Figure 8:
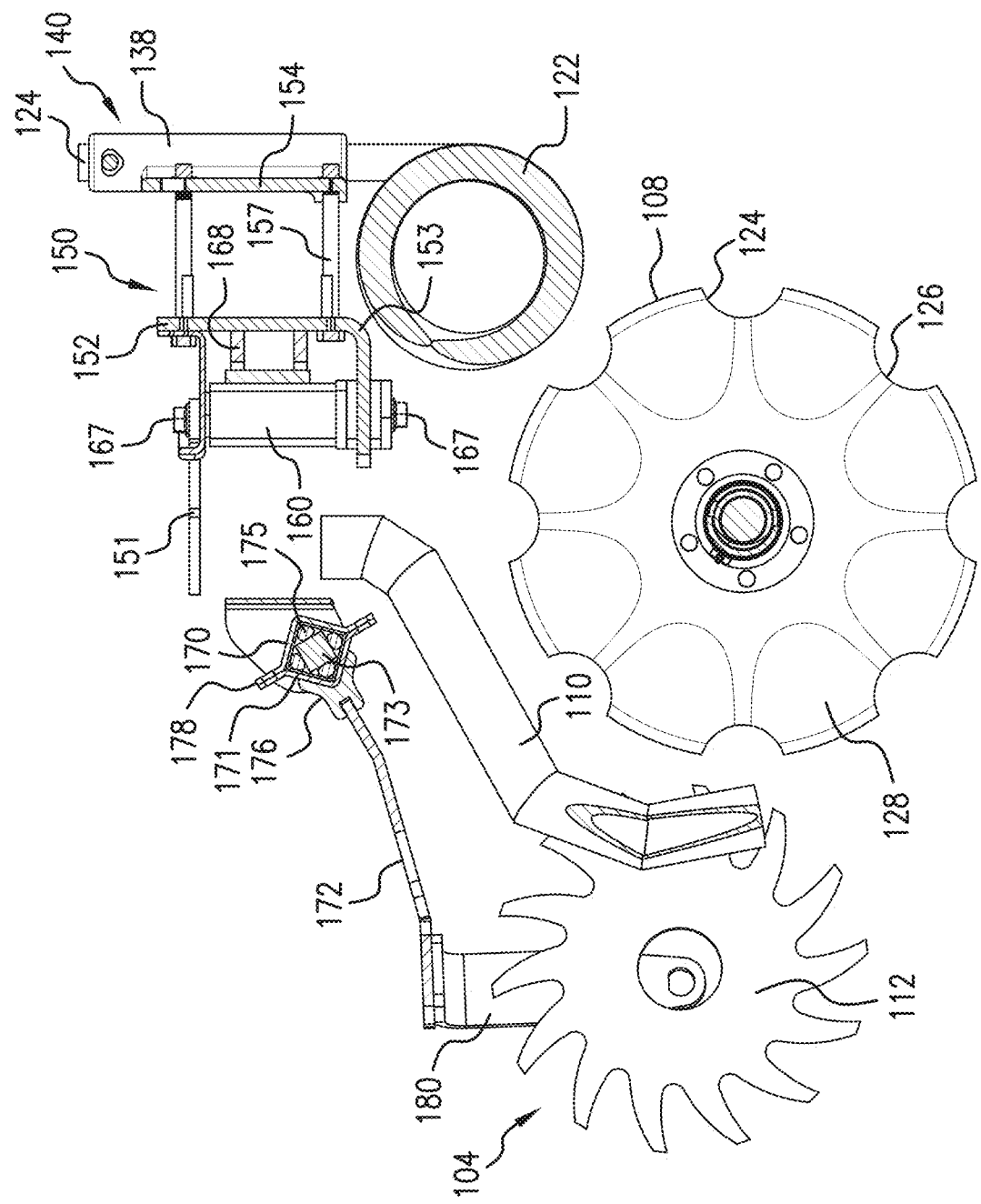
FIG. 8 is a side-sectional view of the slurry injector of FIG. 2 taken on the line 8-8.

Turning to FIG. 5, which shows a close-up view of resilient device 160, it can comprise a torsion block which comprises of an outer casing 162 comprising a plurality of sides, an inner tube 164 comprising a plurality of sides, and a plurality of inserts 166 each one of which is positioned between one of the plurality of sides of inner tube 164 and outer casing 162. In the illustrated embodiment, outer casing 162 of resilient device 160 comprises four sides, and inner tube 164 comprises four sides. Inner tube 164 is rotated forty five degrees (45°) with respect to outer casing 162 such that each one of the four sides of inner tube 164 is rotated forty five degrees with respect to a corresponding one of the four sides of outer casing 162. A corresponding four inserts 166 are shown each one of which is positioned between one of the four sides of inner tube 164 and outer casing 162. While four sides for each of outer casing 162 and inner tube 164 are shown, one skilled in the art will recognize that other geometric cross-sections can be provided to decrease or increase the number of sides.

As stated above, second frame 158 is attached to first resilient device 160. In an embodiment, second frame 158 is welded to outer casing 162 of first resilient device 160 implemented as a torsion block. A pair of opposing fasteners 167 attach opposite sides of inner tube 164 to first frame 150 by way of a top member 151 and a bottom member 153 each attached to first frame 150. An axis extends through fasteners 167. By this arrangement, lateral movement of second frame 158 causes outer casing 162 to similarly rotate about the vertical axis compressing inserts 166 against inner tube 164. Inserts 166 then urge second frame 158 back to the neutral position. This arrangement allows for the back and forth pivoting movement described above.

Second frame 158 is also spaced apart from plate 152 of first frame 150. In an embodiment, at least one stop 168 is attached to plate 152 to provide a rotational limit of second frame 158. In this regard, closing unit 104 can pivot side-to-side from the neutral position twenty degrees or in a range of one degree to thirty degrees, or any angle in between, in each direction in the horizontal plane with respect to an axis extending through the center of resilient device 160.

Second frame 158 extends rearward from plate 152 of first frame 150. At the end of second frame 158 is attached a second resilient device 170 which separates second frame 158 from a third frame 172 that holds closing unit 104. Second resilient device 170 is positioned horizontally and can comprise a torsion block which similarly comprises of an outer casing 171 comprising a plurality of sides, an inner tube 173 comprising a plurality of sides, and a plurality of inserts 175 each one of which is positioned between one of the plurality of sides of inner tube 173 and outer casing 171. In the illustrated embodiment, outer casing 171 of torsion block comprises four sides, and inner tube 173 comprises four sides. Inner tube 173 is rotated forty five degrees (45°) with respect to outer casing 171 such that each one of the four sides of inner tube 173 is rotated forty five degrees with respect to a corresponding one of the four sides of outer casing 171. A corresponding four inserts 175 are shown each one of which is positioned between one of the four sides of inner tube 173 and outer casing 171. While four sides for each of outer casing 171 and inner tube 173 are shown, one skilled in the art will recognize that other geometric cross-sections can be provided to decrease or increase the number of sides.

Second resilient device 170 is oriented horizontally and attached between brackets 177 on second frame 158. At least one fastener 174 attaches second frame 158 to inner tube 173 of second resilient device 170 implemented as a torsion block to define a horizontal axis that extends through inner tube 173 of second resilient device 170. As stated above, third frame 172 is attached to outer casing 171 of second resilient device 170. In an embodiment, frame 172 has bracket 176 that is attached by fasteners to projecting members 178 that is attached to the outer casing 171 of second resilient device 170. This arrangement allows for the up and down vertical movement about the horizontal axis. Third frame 172 extends rearward of second frame 158 with a pair of attachment members 180 each of which is combined containment wheels 112.

Disclosed herein is a slurry injector 120 with an independent opening unit 103 and closing unit 104 each of which moves independently laterally, side-to-side in the horizontal plane, and vertically, up-and-down in the vertical plane. This gives slurry injector 120 superior maneuverability for traversing rough terrain in a field.

The resilient devices disclosed herein are also found in Applicant's pending U.S. patent application Ser. No. 17/406,719, which was filed on Aug. 19, 2021 and titled Dampening System for a Manure Injection System, the content of which are hereby incorporated by reference herein.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A slurry injector comprising:
a first frame;
an opening unit for creating a trough;
a hose positioned behind the opening unit for directing slurry into the trough;
a closing unit positioned behind the hose for closing the trough;
a first biasing element positioned between the opening unit and the first frame for urging the opening unit downward;
a lateral pivot combining the first biasing element to the first frame to allow for lateral movement in a horizontal plane of the opening unit;
a first resilient device positioned between the closing unit and the first frame to allow for lateral movement about a vertical axis of the closing unit and with respect to the opening unit and to urge the closing unit back to a neutral position; and
a second resilient device positioned between the closing unit and the first frame to allow for vertical movement about a horizontal axis and to urge the closing unit back to a neutral position.

2. The slurry injector of claim 1, wherein the first biasing element is a torsion spring.

3. The slurry injector of claim 2, wherein the torsion spring comprises multiple coils around an axis which is oriented parallel to the ground.

4. The slurry injector of claim 3, wherein the torsion spring comprises an extending portion that extends from an end of the multiple coils for attaching the torsion spring to the opening unit.

5. The slurry injector of claim 4, wherein the extending portion is oriented at an angle $\alpha$ with respect to the ground where a can be 5° through 55°, inclusive, or any angle there between.

6. The slurry injector of claim 3, wherein the torsion spring further comprises a vertical extending portion that extends from an end of the multiple coils; a through hole in the vertical extending portion; a sleeve attached to the first frame for receiving the vertical extending portion of the torsion spring; a two-lobed hole in the sleeve; and a pin extending through the hole in the vertical extending portion of the torsion spring and the two-lobed hole in the sleeve.

7. The slurry injector of claim 6, wherein the pin is oriented parallel to the axis of the multiple coils of the torsion spring.

8. The slurry injector of claim 1, wherein the first resilient device is a torsion block comprising an outer casing comprising a plurality of sides; an inner tube comprising a plurality of sides; and a plurality of inserts each one of which is positioned between one of the plurality of sides of the inner tube and the outer casing.

9. The slurry injector of claim 8, wherein the outer casing of the torsion block is combined to the closing unit and the inner tube of the torsion block is combined to the first frame, wherein the outer casing rotates with respect to inner tube which causes the lateral movement about the vertical axis with respect to the first frame.

10. The slurry injector of claim 1, wherein the second resilient device is a torsion block comprising an outer casing comprising a plurality of sides; an inner tube comprising a plurality of sides; and a plurality of inserts each one of which is positioned between one of the plurality of sides of the inner tube and the outer casing.

11. The slurry injector of claim 10, wherein the outer casing of the torsion block is combined to the closing unit and the inner tube of the torsion block is combined to the first frame, wherein the outer casing rotates with respect to inner tube which causes the vertical movement about the horizontal axis.

12. A slurry injector comprising:
a first frame;
an opening unit for creating a trough;
a hose positioned behind the opening unit for directing slurry into the trough;
a closing unit positioned behind the hose for closing the trough;
a first biasing element positioned between the opening unit and the first frame for urging the opening unit downward;
a lateral pivot combining the first biasing element to the first frame to allow for lateral movement in a horizontal plane of the opening unit;
a first resilient device positioned between the closing unit and the first frame to allow for lateral movement about a vertical axis of the closing unit and to urge the closing unit back to a neutral position; and
a second resilient device positioned between the closing unit and the first frame to allow for vertical movement about a horizontal axis and to urge the closing unit back to a neutral position, and further comprising a second frame; wherein the first resilient device further comprises: an outer casing comprising a plurality of sides, an inner tube comprising a plurality of sides, and a plurality of inserts each one of which is positioned between one of the plurality of sides of the inner tube and the outer casing; and wherein the closing unit is combined to the second frame and the second frame is combined to the outer casing of the first resilient device and the first frame is combined to the inner casing of the first resilient device with the vertical axis extending therethrough wherein the second frame pivots with respect to the first frame about the vertical axis.

13. The slurry injector of claim 12, and further comprising a third frame; wherein the second resilient device further comprises: an outer casing comprising a plurality of sides, an inner tube comprising a plurality of sides, and a plurality of inserts each one of which is positioned between one of the plurality of sides of the inner tube and the outer casing; and wherein the closing unit is combined to the third frame and the third frame is combined to the outer casing of the second resilient device and the second frame is combined to the inner casing of the second resilient device with a horizontal axis extending therethrough wherein the third frame pivots with respect to the second frame about the horizontal axis.

14. A slurry injector comprising:
a first frame;
an opening unit for creating a trough;
a hose positioned behind the opening unit for directing slurry into the trough;
a second frame;
a closing unit attached to the second frame and positioned behind the hose for closing the trough;
a first biasing element positioned between the opening unit and the first frame for urging the opening unit downward;
a first resilient device positioned between the first frame and the second frame to allow for lateral movement about a vertical axis of the closing unit with respect to the opening unit.

15. The slurry injector of claim 14, wherein the first biasing element is a torsion spring comprising multiple coils around an axis which is oriented parallel to the ground, an extending portion for attaching the torsion spring to the opening unit that extends from an end of the multiple coils at an angle $\alpha$ with respect to the ground where a can be 5° through 55°, inclusive, or any angle there between.

16. The slurry injector of claim 15, and further comprising: a lateral pivot combining the torsion spring to the first frame to allow for lateral movement in a horizontal plane of the opening unit; and a second resilient device positioned between the closing unit and the second frame to allow for vertical movement about a horizontal axis and to urge the closing unit back to a neutral position.

17. The slurry injector of claim 16, wherein the first resilient device further comprises: an outer casing comprising a plurality of sides, an inner tube comprising a plurality of sides, and a plurality of inserts each one of which is positioned between one of the plurality of sides of the inner tube and the outer casing; and wherein the closing unit is combined to the second frame and the second frame is combined to the outer casing of the first resilient device and the first frame is combined to the inner casing of the first resilient device with the vertical axis extending therethrough wherein the second frame pivots with respect to the first frame about the vertical axis.

18. The slurry injector of claim 17, and further comprising a third frame; wherein the second resilient device further comprises: an outer casing comprising a plurality of sides, an inner tube comprising a plurality of sides, and a plurality of inserts each one of which is positioned between one of the plurality of sides of the inner tube and the outer casing; and wherein the closing unit is combined to the third frame and the third frame is combined to the outer casing of the second resilient device and the second frame is combined to the inner casing of the second resilient device with a horizontal axis extending therethrough wherein the third frame pivots with respect to the second frame about the horizontal axis.

19. The slurry injector of claim 15, wherein the torsion spring further comprises a vertical extending portion that extends from an end of the multiple coils; a through hole in the vertical extending portion; a sleeve attached to the first frame for receiving the vertical extending portion of the torsion spring.

20. The slurry injector of claim 19, and further comprising a hole in the sleeve; and a pin extending through the hole in the vertical extending portion of the torsion spring and the hole in the sleeve, wherein the pin is oriented parallel to the axis of the multiple coils of the torsion spring.

21. A slurry injector comprising:
a first frame;
an opening unit for creating a trough;
a hose positioned behind the opening unit for directing slurry into the trough;
a second frame;
a closing unit attached to the second frame and positioned behind the hose for closing the trough;
a first resilient device positioned between the second frame and the first frame to allow for lateral movement about a vertical axis of the closing unit with respect to the first frame and the opening unit and to urge the closing unit back to a neutral position; and
a second resilient device positioned between the closing unit and the second frame to allow for vertical movement about a horizontal axis with respect to the second frame and the first frame and to urge the closing unit back to a neutral position.

22. The slurry injector of claim 21, and further comprising:
a first biasing element positioned between the opening unit and the first frame for urging the opening unit downward; and
a lateral pivot combining the first biasing element to the first frame to allow for lateral movement in a horizontal plane of the opening unit.

23. The slurry injector of claim 21, wherein the first resilient device is a torsion block comprising an outer casing comprising a plurality of sides; an inner tube comprising a plurality of sides; and a plurality of inserts each one of which is positioned between one of the plurality of sides of the inner tube and the outer casing.

24. The slurry injector of claim 23, wherein the outer casing of the torsion block is combined to the closing unit and the inner tube of the torsion block is combined to the first frame, wherein the outer casing rotates with respect to inner tube which causes the lateral movement about the vertical axis with respect to the first frame.

25. The slurry injector of claim 21, wherein the second resilient device is a torsion block comprising an outer casing comprising a plurality of sides; an inner tube comprising a plurality of sides; and a plurality of inserts each one of which is positioned between one of the plurality of sides of the inner tube and the outer casing.

26. The slurry injector of claim 25, wherein the outer casing of the torsion block is combined to the closing unit and the inner tube of the torsion block is combined to the first frame, wherein the outer casing rotates with respect to inner tube which causes the vertical movement about the horizontal axis.

27. The slurry injector of claim 21, wherein the first resilient device further comprises: an outer casing comprising a plurality of sides, an inner tube comprising a plurality of sides, and a plurality of inserts each one of which is positioned between one of the plurality of sides of the inner tube and the outer casing; and wherein the closing unit is combined to the second frame and the second frame is combined to the outer casing of the first resilient device and the first frame is combined to the inner casing of the first resilient device with the vertical axis extending therethrough wherein the second frame pivots with respect to the first frame about the vertical axis.

28. The slurry injector of claim 27, and further comprising a third frame; wherein the second resilient device further comprises: an outer casing comprising a plurality of sides, an inner tube comprising a plurality of sides, and a plurality of inserts each one of which is positioned between one of the plurality of sides of the inner tube and the outer casing; and wherein the closing unit is combined to the third frame and the third frame is combined to the outer casing of the second resilient device and the second frame is combined to the inner casing of the second resilient device with a horizontal axis extending therethrough wherein the third frame pivots with respect to the second frame about the horizontal axis.

* * * * *